US008623191B2

(12) United States Patent
Cernasov

(10) Patent No.: US 8,623,191 B2
(45) Date of Patent: Jan. 7, 2014

(54) NON-VOLATILE ADDRESSABLE ELECTRONIC PAPER WITH GRAY LEVEL CAPABILITY

(75) Inventor: Andrei Cernasov, Ringwood, NJ (US)

(73) Assignee: Honeywell International Inc., Morristown, NJ (US)

(*) Notice: Subject to any disclaimer, the term of this patent is extended or adjusted under 35 U.S.C. 154(b) by 1976 days.

(21) Appl. No.: 11/534,370

(22) Filed: Sep. 22, 2006

(65) Prior Publication Data
US 2008/0073211 A1 Mar. 27, 2008

(51) Int. Cl.
C07K 1/26 (2006.01)
G01N 27/00 (2006.01)

(52) U.S. Cl.
USPC .......... 204/450; 204/606; 359/254; 359/265; 359/296; 359/315

(58) Field of Classification Search
USPC .......... 345/107; 359/107, 254, 265, 296, 315; 428/195.1; 204/450, 606
See application file for complete search history.

(56) References Cited

U.S. PATENT DOCUMENTS

| | | | |
|---|---|---|---|
| 5,293,528 A | 3/1994 | DiSanto et al. | |
| 5,745,094 A | 4/1998 | Gordon, II et al. | |
| 5,872,552 A | 2/1999 | Gordon, II et al. | |
| 5,961,804 A | 10/1999 | Jacobson et al. | |
| 6,067,185 A * | 5/2000 | Albert et al. | 359/296 |
| 6,124,851 A * | 9/2000 | Jacobson | 345/206 |
| 6,144,361 A | 11/2000 | Gordon, II et al. | |
| 6,172,798 B1 | 1/2001 | Albert et al. | |
| 6,271,823 B1 | 8/2001 | Gordon, II et al. | |
| 6,337,761 B1 | 1/2002 | Rogers et al. | |
| 6,525,865 B2 | 2/2003 | Katase | |
| 6,525,866 B1 | 2/2003 | Lin et al. | |
| 6,529,313 B1 | 3/2003 | Lin et al. | |
| 6,535,326 B2 | 3/2003 | Uno | |
| 6,574,034 B1 | 6/2003 | Lin et al. | |
| 6,636,341 B2 | 10/2003 | Kanbe | |
| 6,639,580 B1 | 10/2003 | Kishi et al. | |
| 6,650,462 B2 | 11/2003 | Katase | |
| 6,650,463 B2 | 11/2003 | Obikawa et al. | |
| 6,677,926 B2 | 1/2004 | Biegelsen | |
| 6,680,726 B2 | 1/2004 | Gordon, II et al. | |
| 6,693,621 B1 | 2/2004 | Hayakawa et al. | |
| 6,710,540 B1 | 3/2004 | Albert et al. | |
| 6,727,873 B2 | 4/2004 | Gordon, II et al. | |
| 6,727,882 B1 | 4/2004 | Large et al. | |
| 6,727,883 B2 | 4/2004 | Uno et al. | |
| 6,738,039 B2 * | 5/2004 | Goden | 345/107 |
| 6,741,385 B2 | 5/2004 | Ikeda et al. | |
| 6,750,844 B2 | 6/2004 | Nakanishi | |
| 6,751,007 B2 | 6/2004 | Liang et al. | |
| 6,751,008 B2 | 6/2004 | Liang et al. | |
| 6,762,744 B2 | 7/2004 | Katase | |
| 6,781,745 B2 | 8/2004 | Chung et al. | |
| 6,788,449 B2 | 9/2004 | Liang et al. | |
| 6,795,229 B2 | 9/2004 | Liang et al. | |
| 6,806,995 B2 | 10/2004 | Chung et al. | |
| 6,816,146 B2 | 11/2004 | Harada et al. | |
| 6,822,783 B2 | 11/2004 | Matsuda et al. | |
| 6,829,078 B2 | 12/2004 | Liang et al. | |
| 6,831,770 B2 | 12/2004 | Liang et al. | |
| 6,833,943 B2 | 12/2004 | Liang et al. | |
| 6,850,355 B2 | 2/2005 | Liang et al. | |
| 6,850,357 B2 | 2/2005 | Kaneko et al. | |
| 6,859,302 B2 | 2/2005 | Liang et al. | |
| 6,862,129 B2 | 3/2005 | Matsuda et al. | |
| 6,865,012 B2 | 3/2005 | Liang et al. | |
| 6,867,898 B2 | 3/2005 | Liang et al. | |
| 6,873,451 B2 | 3/2005 | Ukigaya | |
| 6,885,495 B2 | 4/2005 | Liang et al. | |

(Continued)

FOREIGN PATENT DOCUMENTS

JP 01214820 8/1989

OTHER PUBLICATIONS http://www.sciencedirect.com/science?_ob=ArticleURL&_udi=B6TX4-3YSXP0X-21&_user=2502287&_coverDate=11%2F30%2F1995&_alid=1508548743&_rdoc=6&_fmt=high&_orig=search&_origin=search&_zone=rslt_list_item&_cdi=5580&_docanchor=&view=c&_ct=24&_acct=C000055109&_version=1&_urlVersion=0&_userid=2502287&md5=a46f20c61af5a7e6df9d5b69a8800b9d&searchtype=a.*

(Continued)

Primary Examiner — Gerard Higgins
Assistant Examiner — Sathavaram I Reddy
(74) Attorney, Agent, or Firm — Ingrassia Fisher & Lorenz, P.C.

(57) ABSTRACT

A device and method for displaying grey levels on electronic paper is provided. According to various embodiments, a system for electronic paper can include an electret substrate embedded with at least one first capsule containing a first plurality of charged pigment particles and at least one second capsule containing a second plurality of charged pigment particles. The system can further include a first electrode interfacing with one side of the electret substrate and a second electrode interfacing with a second side of the electret substrate. The first plurality of charged pigment particles can move in the direction of one of the first and second electrodes having a polarity that is opposite to that of the first plurality of the charged pigment particles in response to a voltage applied to the first and second electrodes that is greater than a first threshold. The second plurality of charged pigment particles can move in the direction of one of the first and second electrodes having a polarity that is opposite to that of the second plurality of the charged pigment particles in response to a voltage applied to the first and second electrodes that is greater than a second threshold, the second threshold differing from the first threshold.

12 Claims, 15 Drawing Sheets

(56) References Cited

U.S. PATENT DOCUMENTS

| | | | |
|---|---|---|---|
| 6,897,996 | B2 | 5/2005 | Ikeda et al. |
| 6,900,924 | B2 | 5/2005 | Goden |
| 6,906,851 | B2 | 6/2005 | Yuasa |
| 6,909,532 | B2 | 6/2005 | Chung et al. |
| 6,922,275 | B2 | 7/2005 | Ikeda |
| 7,307,779 | B1 | 12/2007 | Cernasov |
| 7,637,191 | B2 * | 12/2009 | Zeeb et al. ............ 83/703 |
| 7,746,541 | B2 | 6/2010 | Cernasov |
| 2003/0227665 | A1 * | 12/2003 | Kawai ............ 359/296 |
| 2004/0145561 | A1 * | 7/2004 | Ikeda ............ 345/107 |
| 2005/0122564 | A1 * | 6/2005 | Zehner et al. ............ 359/296 |
| 2005/0270627 | A1 * | 12/2005 | Rabinowitz ............ 359/296 |
| 2006/0279527 | A1 | 12/2006 | Zehner et al. |
| 2007/0297038 | A1 | 12/2007 | Chopra et al. |

OTHER PUBLICATIONS http://www.britannica.com/EBchecked/topic/182378/electret (Feb. 7, 2011).*

PK Khare and Sandeep Jain. "Anomalous thermally stimulated currents and space charge in poly(vinyl pyrollidone)". 2000. Department of Postgraduate Studies and Research in Physics and Electronics, Rani Durgavati University. pp. 265-268.*

Kwan Chi Kao. "Dielectric Phenomena in Solids". 2004. Elsevier Academic Press. Chapter 5—Electrets.*

Cernasov, A.; USPTO Office Action dated Jan. 4, 2010, U.S. Appl. No. 11/560,487.

Cernasov, A.; Response to USPTO Office Action mailed Jan. 4, 2010, U.S. Appl. No. 11/560,487, Response dated Jan. 29, 2010.

Cernasov, A.; USPTO Office Action mailed May 24, 2010, U.S. Appl. No. 11/560,487.

Cernasov, A.; USPTO Office Action mailed Jun. 14, 2010, U.S. Appl. No. 11/560,487.

Cernasov, A.; Response to USPTO Office Actions mailed May 24, 2010 and Jun. 14, 2010, U.S. Appl. No. 11/560,487, Response dated Jun. 23, 2010.

Cernasov, A.; USPTO Office Action mailed Feb. 8, 2010.

Lakshminarayana, K. et al. "Charging and Discharging currents in Poly (Vinyl Pyrrolidone) Polymer Thin Films," Materials Chemistry and Physics 42 (1995) 206-209; received Jul. 29, 1998; revised May 5, 1995, accepted May 17, 1995.

* cited by examiner

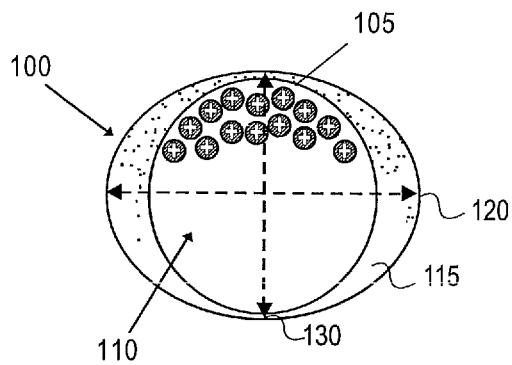
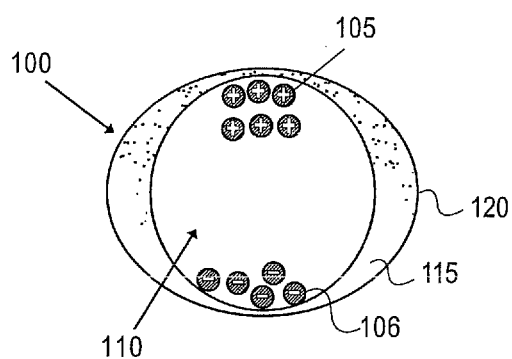
FIG. 1A  FIG. 1B
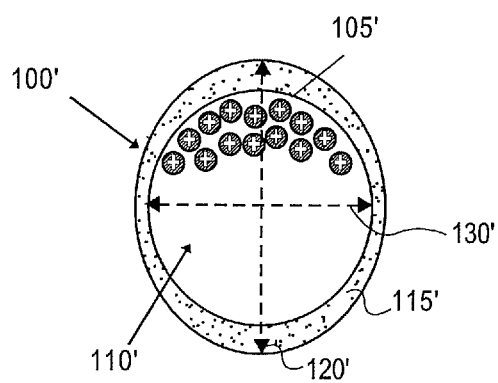
FIG. 2

NON-VOLATILE ADDRESSABLE ELECTRONIC PAPER WITH GRAY LEVEL CAPABILITY

DESCRIPTION OF THE INVENTION

1. Field of the Invention

This invention relates generally to display systems. More particularly, embodiments relate to an apparatus and system for an electrophoretic display.

2. Description of the Related Art

Flexible displays made with a technology known as electronic ink or E-ink™ are in the process of commercial development. While the early versions are expected to resemble simple displays that might sit by the side of a highway to warn of trouble ahead or might advertise specials at a convenience store, later versions are expected to lead to electronic books with paper-like pages and illustrations that move, newspapers that update themselves, reusable paper displays for cellular phones, disposable TV screens, and even electronic wallpaper.

Flexible displays may be divided into two classes. Generally, an encapsulated electrophoretic display includes one or more species of particles that either absorb or scatter light. One example is a system in which the capsules contain electrophoretically mobile particles dispersed in an opaque suspending medium. The electrophoretically mobile particles generally have a color that contrasts the opaque suspending medium. Another example is a system where each capsule contains two separate species of particles having contrasting colors and suspended in a clear suspending fluid. For example, one of the species of particles can absorbs light (black), while the other species of particles scatters light (white). Other extensions are possible, including more than two species of particles, with or without a dye, etc. The particles are commonly solid pigments, dyed particles, or pigment/polymer composites.

There are two general types of particle displays; the first is often referred to as a suspended particle display (SPD). In SPDs the orientation of the particles is selectively controlled to produce the optical contrast required for a display. In an electrophoretic image display (EPID), the distribution of a particle population is selectively controlled in order to produce the optical contrast required for a display. In both cases an electric field is used to control the particles. It should be noted that particles in both display types are suspended in a liquid medium, and in one case the response to the electric field is with respect to orientation, and in the other with respect to distribution.

SPDs are attractive due to their wide viewing angle, high optical transmission and ease of fabrication. With SPDs, light valve action is obtained when sub-micron sized particles with an asymmetric, plate-like shape align with an externally-applied electric field, and thus permit light to pass through (the "light" state). This alignment occurs because the external field induces a dipole moment in the molecules of the particles. In the absence of the external field, the particles orient randomly due to Brownian motion, and consequently block light (the "dark" state).

For example, crystals of iodoquinine sulfate or related compounds may be dispersed in an organic liquid, and because the crystals are dichroic, there is a large difference between the absorption in the unaligned state in comparison to the aligned state. In the absence of an applied field, the random orientation produces a bluish-black appearance, and in the aligned state there is very little absorption and good contrast can be obtained with a white background. A significant disadvantage of SPDs is that the light areas of the display must be continuously energized with the external electric field to maintain the display, thus consuming energy even when the image on the display is static. SPDs also typically lack a clear voltage threshold (threshold), and require active-matrix addressing for high resolution.

In EPIDs, the particles (or ink capsules) used in the display are electrically charged and may either have a color that contrasts with the liquid used to suspend them, for example white particles in a dark blue dye, or may be divided into particles of two contrasting colors with opposite charge. FIG. 6 illustrates conventional particles in a typical EPID. More particularly, FIG. 6a depicts an ink capsule 605 comprised of charged pigment particles 610 of one color. The ink capsule 605 may also contain a fluid 615 of a second color. FIG. 6b depicts an ink capsule 605 with two charged pigments: charged pigment particles of one color 610 and charged pigment particles of a second color 620.

FIG. 7 illustrates a conventional display system 700 with ink capsules 720 suspended in an opaque liquid, where the ink capsules contain charged pigment particles 725 of a first color. As shown in FIG. 7, the display system 700 includes two electrodes 705, 710, respectively, and a substrate 715 (e.g., a flexible supporting film) embedded with ink capsules 720. When an electric field is applied, the charged pigment particles 725 in the ink capsules 720 migrate to the electrode with the polarity opposite of the charge of the pigment particles 725, producing either a light or dark region when viewed from the front (e.g., the top of the substrate 715 shown in FIG. 7), depending on whether the particles 725 are attracted to electrode 705 or 710.

FIG. 8 illustrates a conventional display system 800 with ink capsules of two colors suspended in a clear liquid. As shown in FIG. 8, the display system 800 includes two electrodes 805, 810, respectively, and a substrate 815 embedded with ink capsules 820, where the ink capsules 820 comprise two types of charged pigment particles 825, 830. The first type of pigment particle 825 has a charge opposite to the second type of pigment particle 830. When the electric field is applied, the pigment particles in the capsules 820 move in the direction of the electrode 805 or 810 with the polarity opposite of the charged pigment particles 825, 830 in the capsules 820.

The EPID generally operates by reflection and absorption as opposed to transmission. Although EPIDs have some inherent memory, this memory is due to the viscosity of the liquid medium and therefore decays with time. And because there is no voltage threshold, making multiplexed displays is difficult.

Another problem associated with conventional EPIDs is that they do not display gray levels. Rather, they are essentially ON/OFF type displays where the pigment particles either provide a light state or a dark state.

Thus, the need exists for a particle display that is able to retain a displayed image without an applied external field. There is also a need for a particle display that has a voltage threshold that enables multiplexing. Moreover, a need exists to provide a display that is able to display gray levels.

SUMMARY OF THE INVENTION

An embodiment generally relates to a system for electronic paper. The system for electronic paper can include an electret substrate and a first plurality of capsules embedded in the electret substrate. The first plurality of capsules can comprise a first housing having a first permittivity. The system can further include a second plurality of capsules embedded in the electret substrate. The second plurality of capsules can comprise a second housing having a second permittivity different than the first permittivity. Each of the first plurality of capsules and the second plurality of capsules further comprise a first plurality of charged pigment particles suspended within a fluid.

According to various other embodiments, an apparatus for an electrophoresis display is provided. The apparatus can have an electret substrate including a first family of capsules, each capsule in the first family of capsules having a first threshold and each capsule in the first family capsules comprising a plurality of charged pigments, and a second family of capsules, each capsule in the second family of capsules having a second threshold and each capsule in the second family of capsules comprising a plurality of charged pigments. The apparatus can further include a first electrode interfacing with one side of the electret substrate and a second electrode interfacing with a second side of the electret substrate. The plurality of charged pigment particles in the first family of capsules can move in the direction of one of the first and second electrodes with a polarity that is opposite of charge of the plurality of the charged pigment particles when a voltage applied between the first and second electrodes is greater than the first threshold. The plurality of charged pigment particles in the second family of capsules can move in the direction of one of the first and second electrodes with a polarity that is opposite of charge of the plurality of the charged pigment particles when the voltage applied between the first and second electrodes is greater than the second threshold.

According to still other embodiments, a method of making an electrophoresis display is provided. The method can include embedding a first plurality of capsules in an electret substrate, each capsule in the first plurality of capsules comprising a first plurality of charged pigments. A second plurality of capsules can be embedded in the electret substrate, each capsule in the second plurality of capsules comprising a second plurality of charged pigments. A first electrode can interface with one side of the electret substrate. A second electrode can interface with a second side of the electret substrate, wherein the first plurality of charged pigment particles can move in the direction of one of the first and second electrodes having a polarity that is opposite of the first plurality of charged pigment particles when a voltage applied between the first and second electrodes is greater than a first threshold. The second plurality of charged pigment particles can move in the direction of one of the first and second electrodes having a polarity that is opposite to the second plurality of the charged pigment particles when the voltage applied between the first and second electrodes is greater than a second threshold that differs from the first threshold.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

Various features of the embodiments can be more fully appreciated as the same become better understood with reference to the following detailed description of the embodiments when considered in connection with the accompanying figures, in which:

FIGS. 1A and 1B illustrate exemplary electronic ink capsules in accordance with an embodiment of the invention;

FIG. 2 illustrates another exemplary electronic ink capsule in accordance with an embodiment of the invention;

DESCRIPTION OF EMBODIMENTS

Figure 3A:
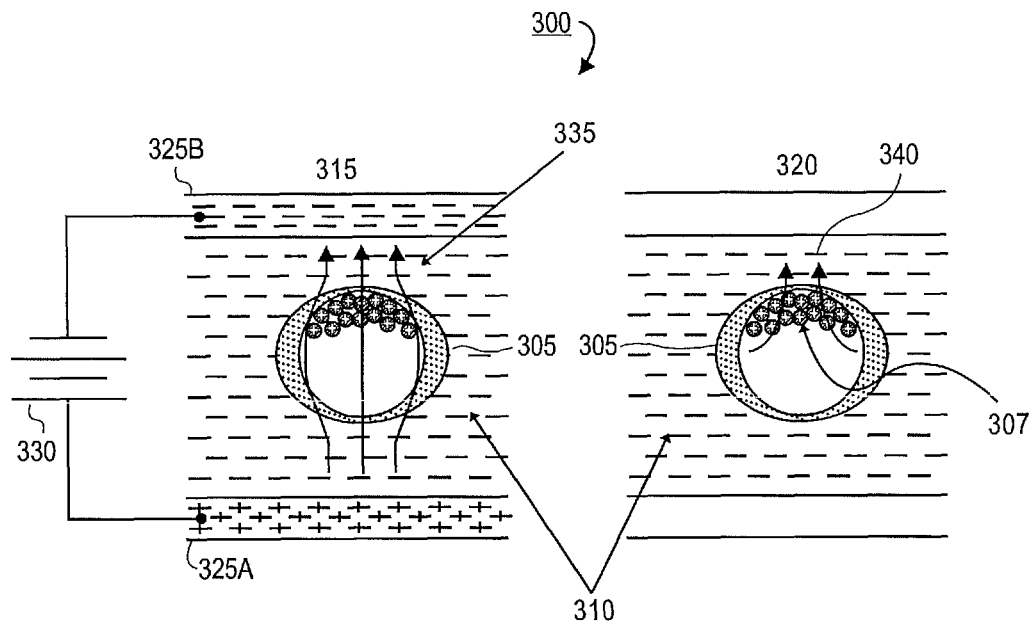
FIGS. 3A and 3B depict an exemplary system with two electric field configurations in accordance with yet another embodiment.

For simplicity and illustrative purposes, the principles of the present invention are described by referring mainly to exemplary embodiments thereof. However, one of ordinary skill in the art would readily recognize that the same principles are equally applicable to, and can be implemented in, various types of electrophoresis display systems, and that any such variations are contemplated as being within the scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Embodiments generally relate to an electrophoretic display system. More particularly, the electrophoretic display system may include a clear electret dielectric substrate. An electrically conductive film may be placed on both sides of the electret dielectric substrate configured to operate as electrodes. The electrically conductive film may be programmable, for example, able to change the amplitude and polarity on a pixel-by-pixel basis. To achieve gray levels, the electret dielectric may be embedded with a plurality of electronic ink capsule families, with each family of capsules having a different threshold voltage (threshold) level. According to various embodiments, different thresholds may be achieved using capsules with size dependent thresholds. It is contemplated, however, that any method of obtaining thresholds for different families of capsules can be used. As such, when a certain voltage level is applied across the film, only capsules with threshold values below the applied voltage will toggle, while the rest of the capsules, those with thresholds above the applied voltage, stay put.

The electronic ink capsules may include a plurality of charged pigments of one color (i.e., ink pigments, ink particles, ink particle pigments, etc.) in a fluid of a second color. In various embodiments, the fluid can be clear. The fluid and pigment particles can be encased in a dielectric housing. According to various embodiments, the housing can be formed of an insulating material. In various other embodiments, the housing can have an electric permittivity from about 1 to about 3.5 or greater. In still other embodiments, the electric permittivity of the housing can be adjusted so as to control the threshold of the capsule by, for example, varying the size, shape, and/or material of the housing.

The housing can have a spherically asymmetric but cylindrically symmetric shape. The clear electret dielectric substrate may be charged with electrical charge opposite in sign of the charge of the pigment particles in the electronic ink capsules. In some embodiments, the combined charge of the electret dielectric substrate may be substantially the same as the total charge of the particle pigments in the ink capsules.

When a predetermined electric field is applied, the charged pigment particles in the electronic ink capsules move either in the direction of the electric field or in a direction opposite to the electric field depending on the threshold level of the capsules, and/or the polarity of the charge of the pigment particles. However, when the electric field is removed or when no electric field is applied, the charged pigment particles within the ink capsules maintain their position. The local electric field between the electret dielectric substrate and the charged pigments prevent movement of the pigments within the ink capsule when no electric field is applied. The local field is not homogeneous because of the asymmetry of the capsule housing and peaks when the pigment is either in the front or back of the capsule. Accordingly, each electronic ink capsule may have a bi-stable characteristic. Moreover, to change a status of a pixel, the voltage applied across the corresponding electrodes has to exceed the potential barrier of the local field. As a result, this makes multiplexing large numbers of pixels not only possible but also very simple and therefore inexpensive.

Reference will now be made in detail to embodiments of the present invention, examples of which are illustrated in the accompanying drawings. Wherever possible, the same reference numbers will be used throughout the drawings to refer to the same or like parts.

FIGS. 1A and 1B illustrate exemplary electronic ink capsules 100 in accordance with various embodiments. As shown in FIG. 1A, capsule 100 may include charged pigment particles 105 (or charged ink pigments, charged ink particles, etc.) and a fluid 110, which are encased by a housing 115. The charged pigments 105 can be a first color and the fluid 110 can be opaque. In various other embodiments, as shown in FIG. 1B, capsule 100 may include charged pigment particles 105, charged pigment particles 106, and clear fluid 110, all of which are encased by a housing 115. Charged pigment particles 105 can have a color that contrasts with a color of charged pigment particles 106. For example, if the color of particles 105 is black, the color of particles 106 would be preferably white. Accordingly, other color schemes with great contrast are contemplated for other embodiments. Moreover, the charge of particles 105 can be opposite to the charge of particles 106.

For illustrative purposes only, the electronic ink capsule 100 is depicted with a reference plane 120 and an axis 130. The reference plane 120 generally surrounds the "equator" of the electronic ink capsule 100.

The housing 115 of ink capsules 100 may be implemented with a low permittivity dielectric material such as Teflon™ (polytetrafloroethylene), polyethylene or other similar material. Moreover, the housing 115 may be formed in a cylindrically symmetric shape. In some embodiments, housing 115 may be spherically asymmetric and cylindrically symmetric around axis 130. In other embodiments, the housing 115 may be implemented as part of an electret that is not charged. More particularly, the ink capsule 100 may be embedded in a charged electret. However, a region of uncharged electret may be formed around the equator of the reference plane 120 of the ink capsule 100. The housing 115 of the ink capsule 100 may be implemented with low permittivity material for these embodiments.

According to various embodiments, the permittivity of the housing 115 may be related to the shape, size, and permittivity of the housing material used to make housing 115 as depicted in FIG. 1. More particularly, the thickness of the dielectric is the greatest proximate the reference plane 120 of the housing 115. Similarly, the thickness of the housing 115 is the smallest proximate the poles of the axis 130 of the housing 115. Exemplary housing materials can include, for example, materials that are good insulators. In various embodiments, no housing is required as the electret can serve as a virtual wall. Further, the diameter of the capsules can range in size from about 50 μm to about 200 μm.

FIG. 2 illustrates another embodiment of an exemplary electronic ink capsule 100' with a high permittivity dielectric housing. As shown in FIG. 2, capsule 100' may include charged pigments 105' and an opaque fluid 110', which are encased by a housing 115'. The charged pigments 105' may be a first color and the opaque fluid 110' may contrast the first color.

For illustrative purposes only, electronic ink capsule 100' is depicted with a reference plane 130' and an axis 120'.

The housing 115' of capsule 100' may be implemented with a dielectric material, the electric permittivity of which can be selected as desired. Moreover, the housing 115' may be formed in a cylindrically symmetric shape. In some embodiments, housing 115' may be spherically asymmetric and cylindrically symmetric around axis 120'. For this embodiment, a high permittivity dielectric material may be used to implement the housing 115', where the thickness of the housing 115' is greatest around the poles of the axis 120' and thinnest around the equator of the reference plane 130'. In other embodiments, the housing 115' may be implemented as part of an electret that is not charged. More particularly, the ink capsule 100' with a high permittivity housing 115' may be eventually embedded in a charged electret. However, an uncharged area surrounding the ink capsule 100' may be formed to become a housing that is similar to housing 115 with the same orientation. Similarly, as with the embodiment in FIG. 1, for enhanced stability, the combined charge of the electret should be substantially equal to the total charge of the pigments 105' contain in the capsules 100'.

Figure 3B:
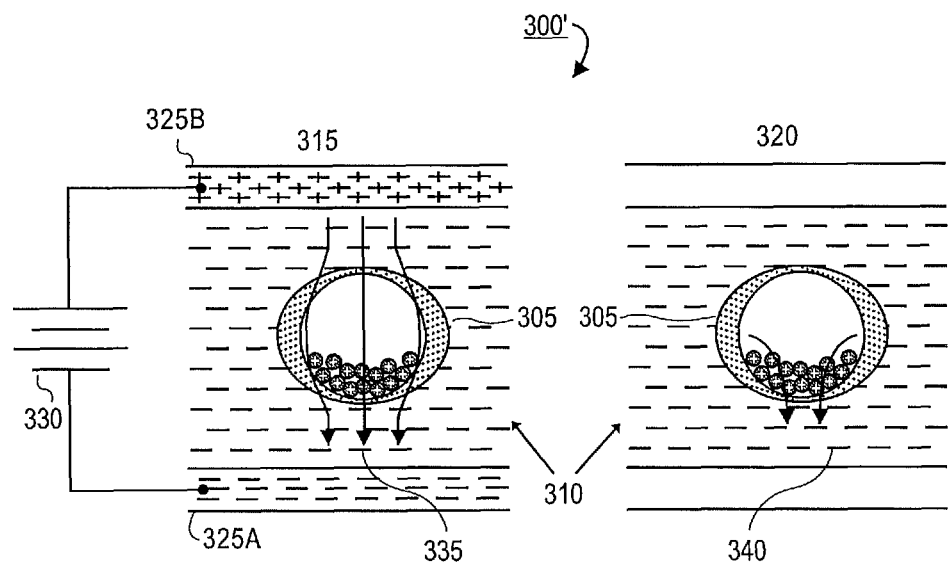

FIGS. 3A and 3B illustrate exemplary systems 300 and 300', respectively. For matters of simplicity, systems 300 and 300' are depicted with a single ink capsule 305. It should be understood, however, that it is well within the scope of the embodiments that each system 300 and 300' contain multiple ink capsules.

As shown in FIGS. 3A and 3B, the components of systems 300 and 300' are identical. More particularly, each system 300 and 300' may comprise an ink capsule 305 embedded in a charged electret substrate 310. The ink capsule 305 comprises a plurality of charged pigment particles 307. Electrode 325A may be interfaced with one side of the charged electret substrate 310 and electrode 325B may be interface with the second side of the charged electret substrate 310. Systems 300 and 300' may also include a power supply 330. System 300 depicts a voltage applied scenario 315 where the electric field is in one direction and system 300' depicts a voltage applied scenario 315 where the electric field is reversed from system 300.

As shown in FIG. 3a for system 300, when a voltage source 330 is applied to the electrodes 325, the electrode 325A develops a positive polarity and the electrode 325B develops a negative polarity. In system 300', the electrode 325A develops a negative polarity and the electrode 325B develops a positive polarity because the power supply has been reversed.

Accordingly, an electric field 335 is developed across the electret substrate 310, which is greater than the local electric field between the charged pigments in the ink capsule 305 and the charged electret substrate 310. As a result, the charged pigments 307 within the ink capsule 305 move toward the electrode 325B with the negative polarity in system 300 and toward the electrode 325A with negative polarity in system 300'. As shown in systems 300 and 300', the pigments 307 move with the electric field 335 because the charge of the pigment particles 307 in the ink capsule 305 is positive. It is contemplated, however, that the charge of the pigment particles 307 can be negative.

In the no voltage scenario 320 where the electric field 335 is removed, the pigment particles 307 within the ink capsule 305 can maintain their position. The anchoring effect may be due to the local electric field 340 established between the charged pigments 307 in the capsule 305 and the oppositely charged electret 310. The local electric field 340 is not homogeneous because of the asymmetry of the housing of the capsule 305. Rather, it peaks when the pigment is either in the front shown in system 300 or back as shown in system 300'. More particularly, when no external field across the electret substrate 310, the electric field generated around the thicker part of the low permittivity housing is smaller than the electric field generated around the thinner portions of the housing. Accordingly, this results in a net field going from the thicker portions of the housing to the thinner portions of the housing, which is illustrated by the field arrows of the local electric field 340. This property of the electric field may also give each capsule its bi-stable character.

Figure 4:
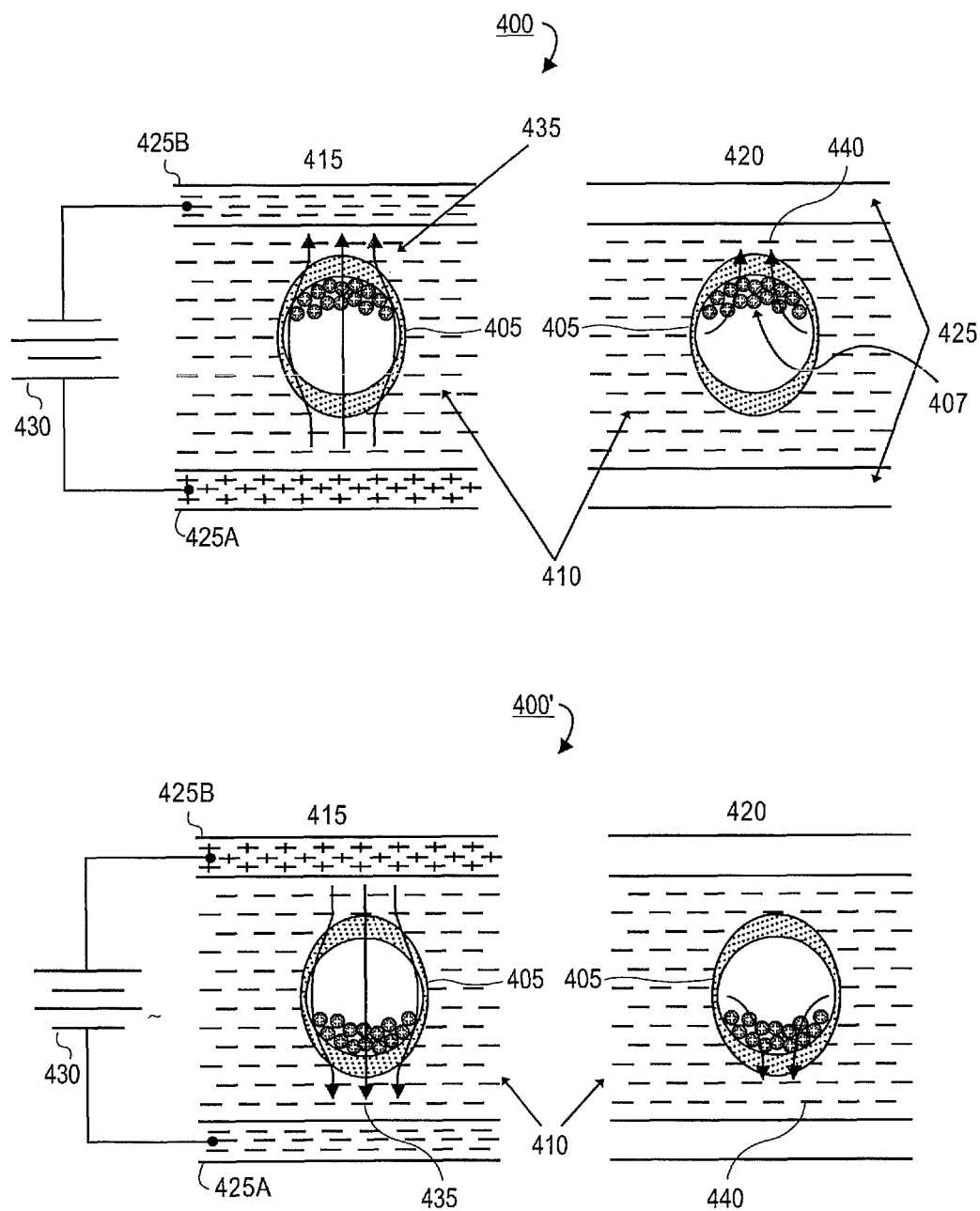
FIG. 4 illustrates another exemplary system with two electric field configuration in accordance with yet another embodiment.

FIG. 4 illustrates an exemplary system 400 and system 400' with an ink capsule comprising high-permittivity housing. For matters of simplicity, systems 400 and 400' are depicted with a single ink capsule. It should be understood as within the scope of the embodiments, however, that each system 400 and 400' may contain multiple ink capsules.

As shown in FIG. 4, the components of 400 and 400' are identical. More particularly, each system 400 and 400' may comprise an ink capsule 405 with charged pigment particles 407 embedded in a charged electret substrate 410. Electrode 425A may be interfaced with one side of the charged electret substrate 410 and electrode 425B may be interface with the second side of the charged electret substrate 410. System 400 and 400' may also include a power supply 430. System 400 depicts a voltage applied scenario 415 where the electric field is in one direction and system 400' depicts a voltage applied scenario 415 where the electric field is reversed from system 400.

As shown in FIG. 4A for system 400, when a voltage source 430 is applied to the electrodes 425, the electrode 425A develops a positive polarity and the electrode 425B develops a negative polarity. As shown in FIG. 4B for system 400', the electrode 425A develops a negative polarity and the electrode 425B develops a positive polarity because the power supply has been reversed.

Accordingly, an electric field 435 is developed across the electret substrate 410, which is greater than the local electric field 440 between the charged pigments 407 and the charged electret substrate 410. As a result, the charged pigment particles 407 within the capsule 405 move toward the electrode 425B with the polarity opposite of the charged pigment particles 407 in system 400. In system 400', the charged pigment particles 407 within the capsule 405 move toward electrode 425A because it has a negative polarity. As shown in system 400 and 400', the pigments 407 move with the electric field 435 because the charge in the ink capsule 405 is positive.

In the no external voltage scenario 420 where the electric field 435 may be removed, the pigment particles 407 within capsule 405 may maintain their position. The anchoring effect may be due to the local electric field 440 established between the charged pigments 407 in the capsule 405 and the oppositely charged electret 410. The local electric field 440 is not homogeneous because of the asymmetry of the housing of the capsule 405. Rather, it peaks when the pigment 407 is either in the front shown in system 400 or back as shown in system 400', from a top view of systems 400 and 400'. More particularly, when no external field is applied across the electret substrate 410, the electric field generated around the thinner part of the high permittivity housing is smaller than the electric field generated around the thicker portions of the high permittivity housing. Accordingly, this results in a net field going from the thinner portions of the housing to the thicker portions of the housing, which is illustrated by the field arrows of the local electric field 440. This property of the electric field may also give each capsule its bi-stable character.

Figure 5:
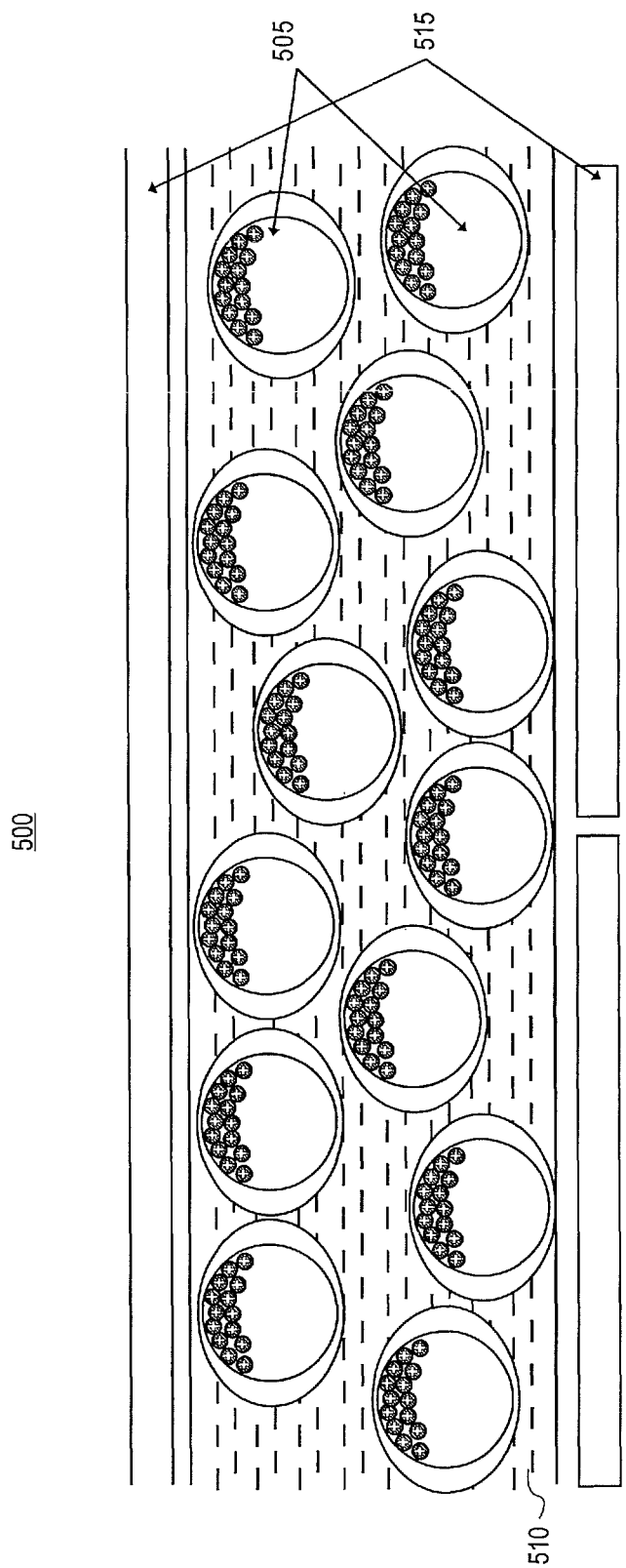
FIG. 5 illustrates another exemplary system in accordance with yet another embodiment.
Figure 6:
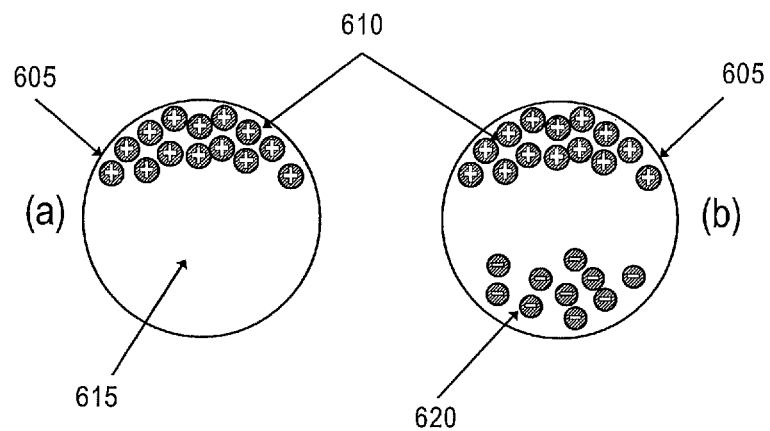
FIG. 6 illustrates a conventional electronic ink capsule.
Figure 7:
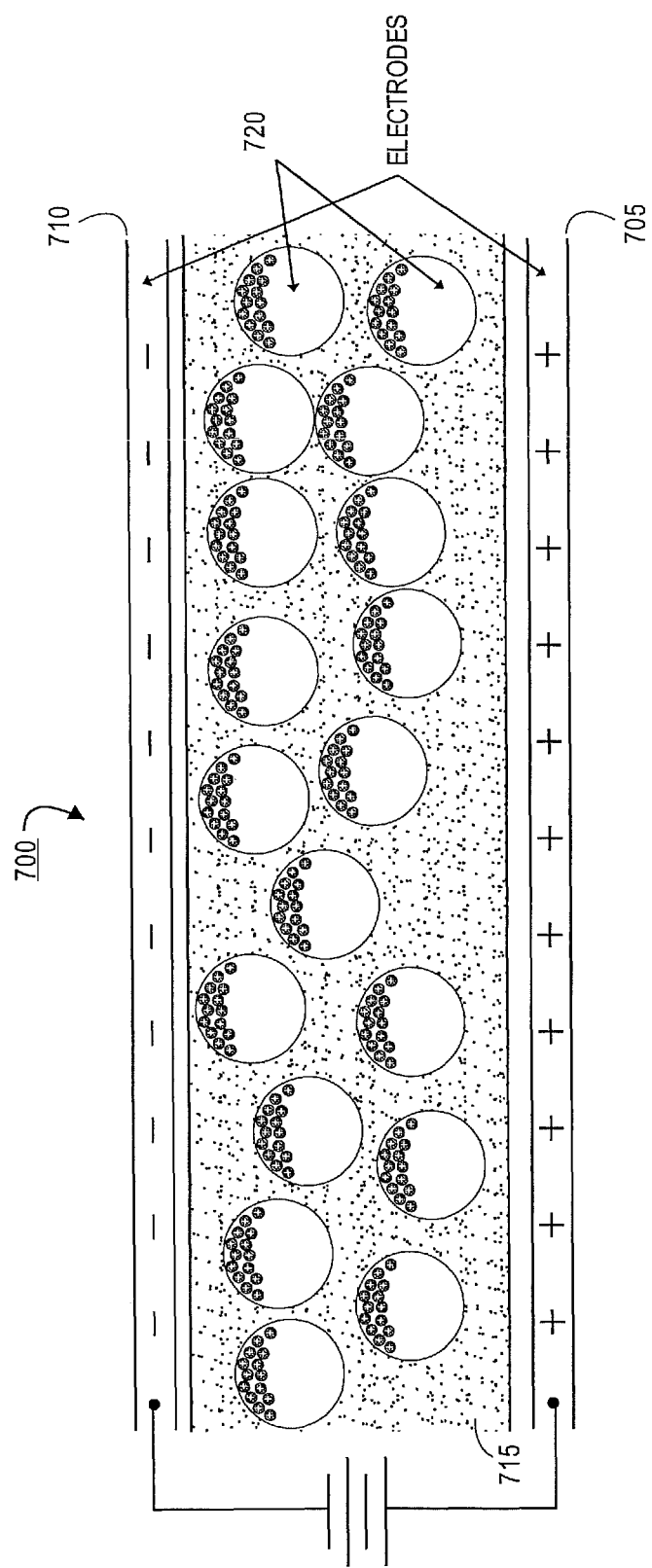
FIG. 7 illustrates a conventional electrophoresis display system for one pigment color.
Figure 8:
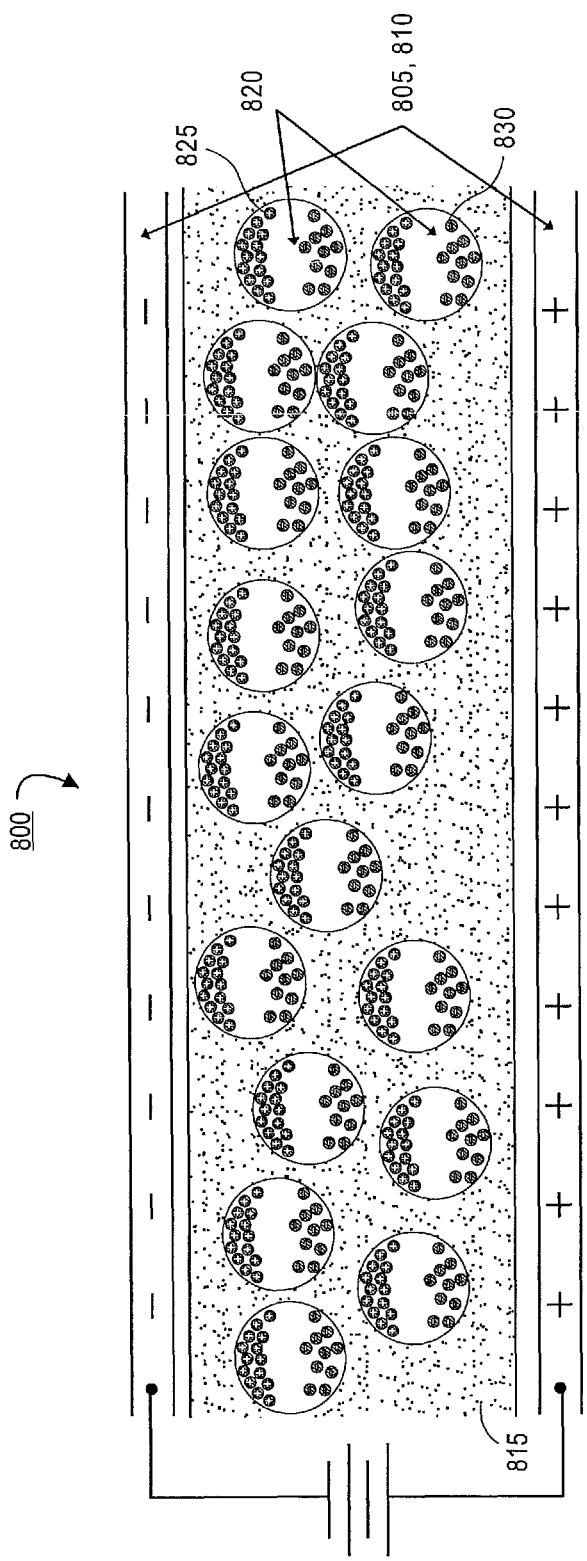
FIG. 8 illustrates a conventional electrophoresis display system for two pigment color.

FIG. 5 illustrated another exemplary system 500 in accordance with yet another embodiment. As shown in FIG. 5, the system 500 includes capsules 505, electret film 510 and a standard X-Y Indium Tin Oxide ("ITO") array 515, which is a transparent and electrically conductive coating used to address LCD pixels. The capsules 505 are embedded in the electret film 510 and the capsules 505 are loosely aligned. An example of the electret film 510 may be Teflon™ (polytetrafloroethylene). Electret film can be formed of materials that are good insulators. The ITO array 515 can be configured to provide control of the capsules 505 on a pixel basis. In some embodiments, conductive polymers can be used to address areas of the electret substrate.

FIGS. 9A-9F illustrate another exemplary system 900 in accordance with yet another embodiment capable of achieving gray levels. For matters of simplicity, system 900 shows three ink capsules, each having a different threshold. It is well within the scope of the embodiments that the system 900 can contain multiple families of ink capsules, where each family comprises multiple capsules and where each family of ink capsules has a different threshold. In system 900, the different thresholds can be obtained using capsules with size dependent thresholds. According to various embodiments, the thresholds can range from about 1.0 volt to about 2.0 volts. In various other embodiments, the thresholds can range from about 0.5 volts to bout 1.5 volts.

Figure 9A:
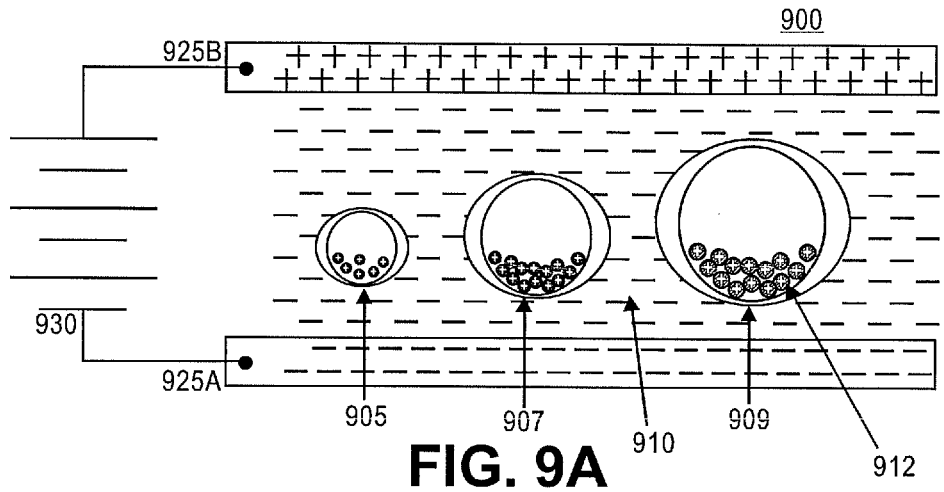
FIGS. 9A-9F illustrate another exemplary system in accordance with yet another embodiment.

In FIG. 9A, there are three capsules 905, 907, and 909, with size dependent thresholds embedded in a charged electret substrate 910. The smallest size capsule 905 has the lowest threshold, the largest capsule 909 has the highest threshold, and the medium size capsule 907 has a threshold between that of smallest capsule 905 and largest capsule 909. Electrode 925A may be interfaced with one side of the charged electret substrate 910 and electrode 925B may be interfaced with the second side of electret substrate 910. System 900 may also include a power supply 930.

In the embodiments of FIG. 9A, a field is applied that is strong enough so that all of the ink particles 912 are pushed toward the negative electrode 925A. Thus, the condition shown in FIG. 9A represents a first level of gray for a display in accordance with the present teachings.

Figure 9B:
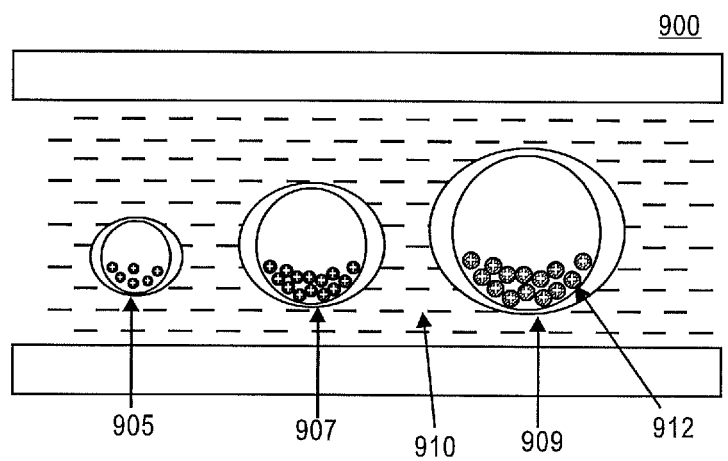

In FIG. 9B, the field is removed, or a voltage below the threshold of the smallest capsule 905 is applied. Because the applied voltage is less than the threshold of the smallest capsule 905, the appearance of the display is similar to that shown in FIG. 9A. In other words, the ink particles 912 maintain their position induced by the applied field in FIG. 9A.

Figure 9C:
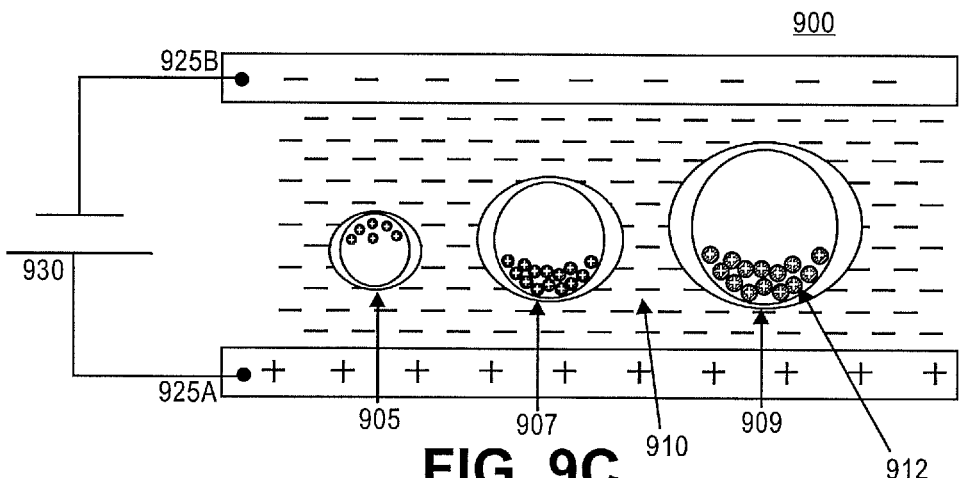

FIG. 9C shows a condition where an electric field above the threshold of the smallest size capsule 905 but below the threshold of the medium size capsule 907 and the large size capsule 909 is applied. In this condition, only the ink 912 in the smallest size capsule 905 moves, in this case toward the negative electrode 925B. The ink 912 in the medium size capsule 907 and in the large size capsule 909 stay put as the electric field is below respective thresholds of these capsules. Thus, a second level of gray for the display is achieved in accordance with the present teachings.

Figure 9D:
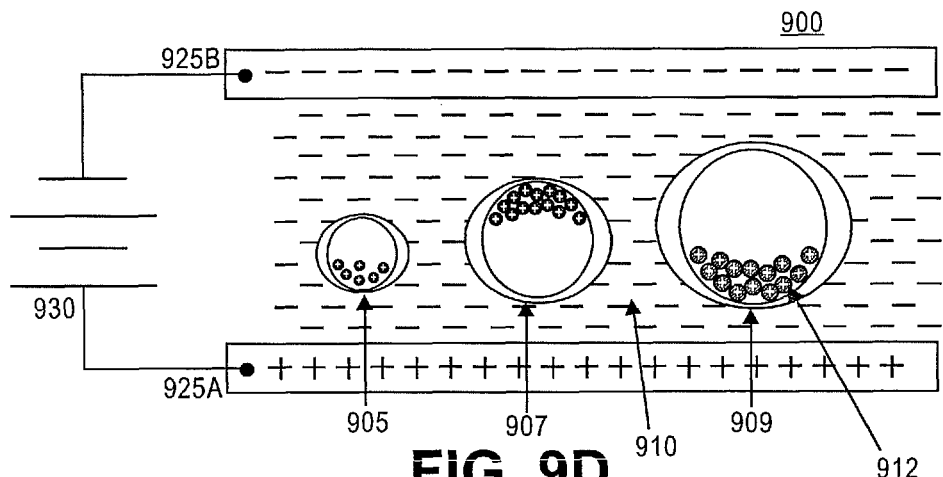

In FIG. 9D, a field above the threshold of the smallest sized capsule 905 and the medium size capsule 907 but below the threshold of the largest size capsule 909 is applied. In this condition, ink 912 in the smallest sized capsule 905 and in the medium size capsule move, in this case toward the positive electrode 925B. The ink 912 in the largest size capsule 909 stays put. Thus, a third level of gray for the display is achieved.

Figure 9E:
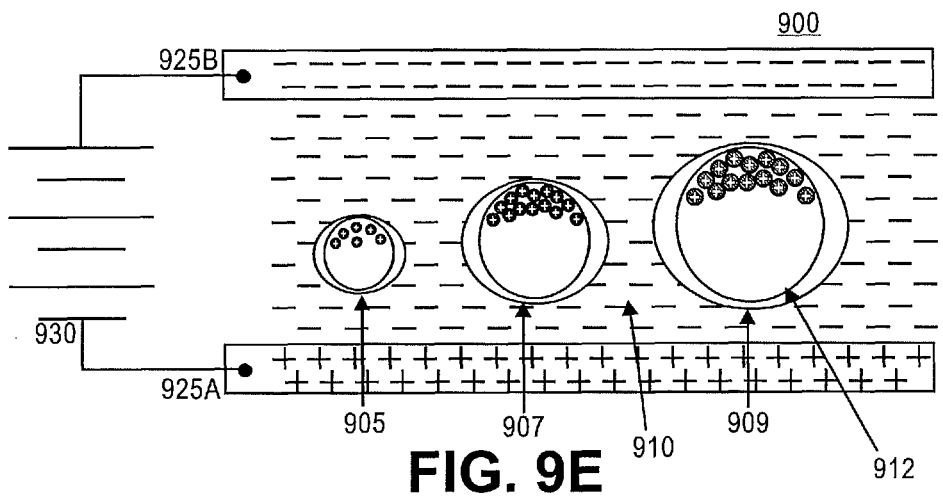
Figure 9F:
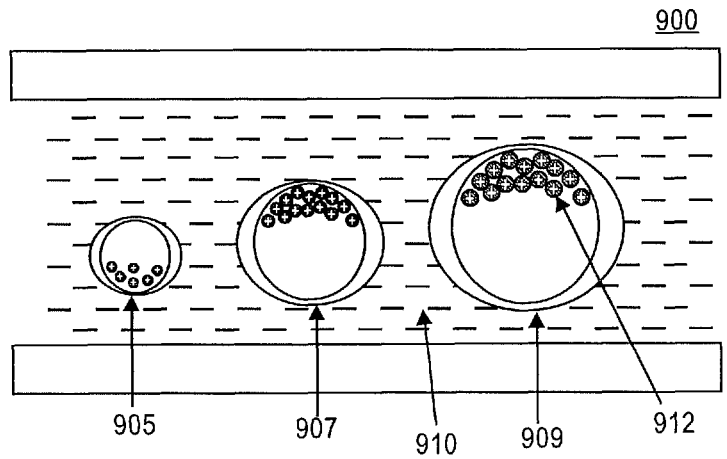

Finally, in FIG. 9E, a field above the threshold of all of the capsules 905, 907, and 909 is applied. In this condition, ink 912 in each of the capsules moves towards the positive electrode 925B thereby generating a fourth gray level. Thereafter, removing the field or applying a field below the threshold of the smallest capsule 905 leaves the display unchanged, as shown in FIG. 9F.

While the present teachings have been illustrated using three capsules having different thresholds, it is to be understood that any number of capsule families can be used. As such, a continuum of gray can be achieved.

Figure 10A:
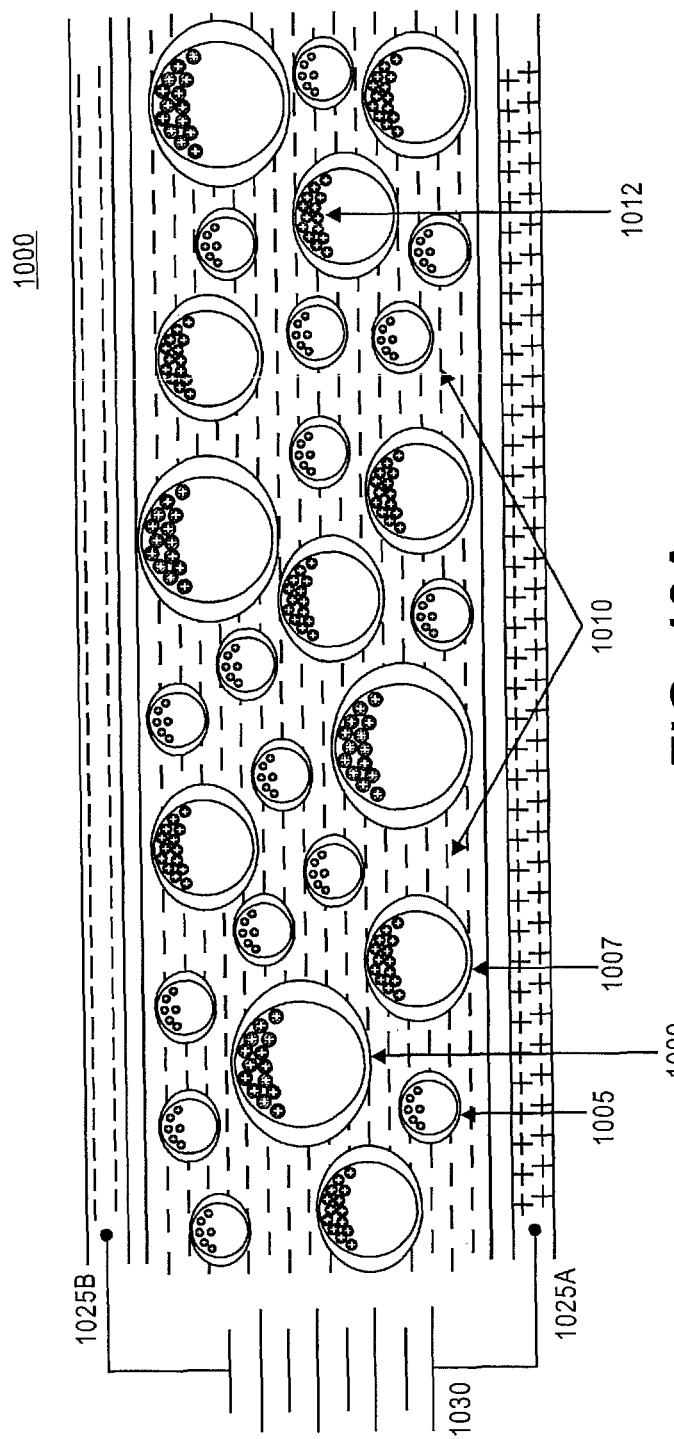
FIGS. 10A-10E illustrate another exemplary system in accordance with yet another embodiment.

A more complete representation of the operation is shown in FIGS. 10a-10e. In particular, FIG. 10A shows a system 1000 comprising plurality of families of capsules, where of the capsules in each family have the same or similar threshold. For example, the smallest capsules 1005 have the same or similar thresholds, the medium capsules 1007 have the same or similar thresholds, and the largest capsules 1009 have the same or similar thresholds. Electrode 1025A may be interfaced with one side of an electret substrate 1010 and electrode 1025B may be interfaced with the second side of electret substrate 1010. System 1000 may also include a power supply 1030.

According to various embodiments, electrodes 1025A and 1025B can comprise X-Y Indium Tin Oxide ("ITO") arrays, which include a transparent and electrically conductive coating used to address LCD pixels. Similarly, conductive polymers can also be used to address the electret substrate. The capsules 1005, 1007, and 1009 are embedded in the electret film 1010 and the capsules 1005, 1007, and 1009 can be loosely aligned. An example of the electret film 1010 may be Teflon™ (polytetrafloroethylene) or the like. The ITO arrays may be configured to provide control of the capsules 1005, 1007, and 1009 on a pixel basis.

Figure 10B:
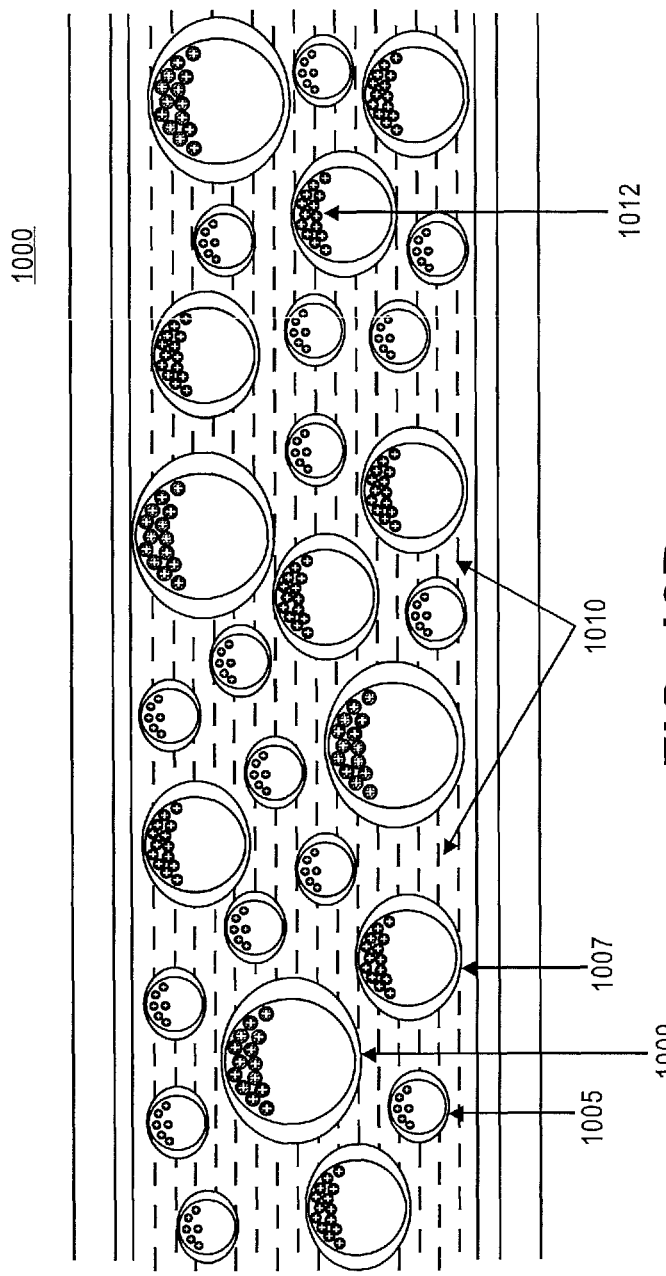

In FIG. 10A, a field strong enough so that all of the ink 1012 is pushed towards one of the electrodes, in this case, the negative electrode 1025B. The condition shown in FIG. 10a represents a first level of gray for a display in accordance with the present teachings. The condition shown in FIG. 10B is where the field is removed, or a voltage below the threshold of the smallest capsules 1005 is applied. Because the applied voltage is less than the threshold of the smallest capsules 1005, the ink 1012 stays pushed towards the negative electrode 1025B, and the appearance of the display remains similar to that shown in FIG. 10A.

Figure 10C:
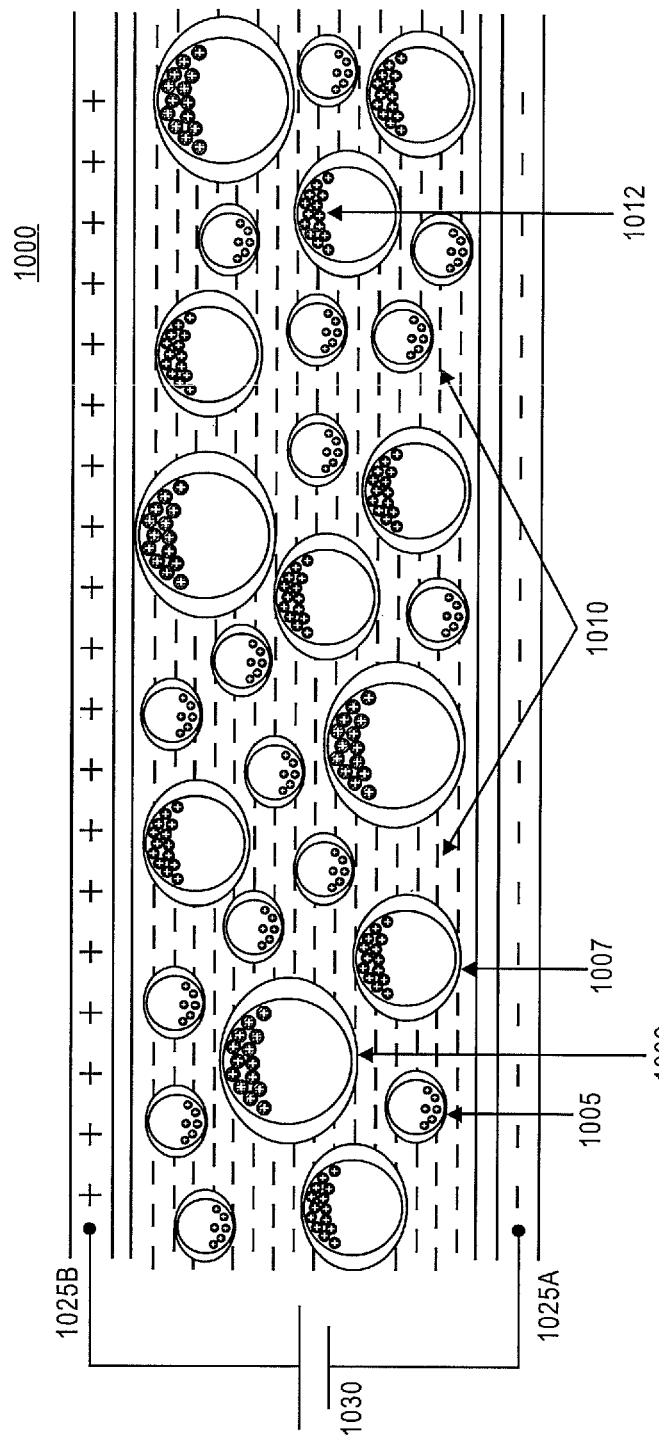

FIG. 10C shows a condition where a field above the threshold of the family of capsules with the smallest size 1005 is applied. In FIG. 10C, the field is below the threshold of the family of capsules having the medium size 1007 and the threshold of the family of capsules having the large size 1009. In this condition, only the ink 1012 in the family of capsules having smallest size 1005 move, in this case toward the now negative electrode 1025A. The ink 1012 in the family of capsules having the medium size 1007 and in family of capsules having the large size 1009 stay put. Thus, a second level of gray for the display in accordance with the present teachings.

Figure 10D:
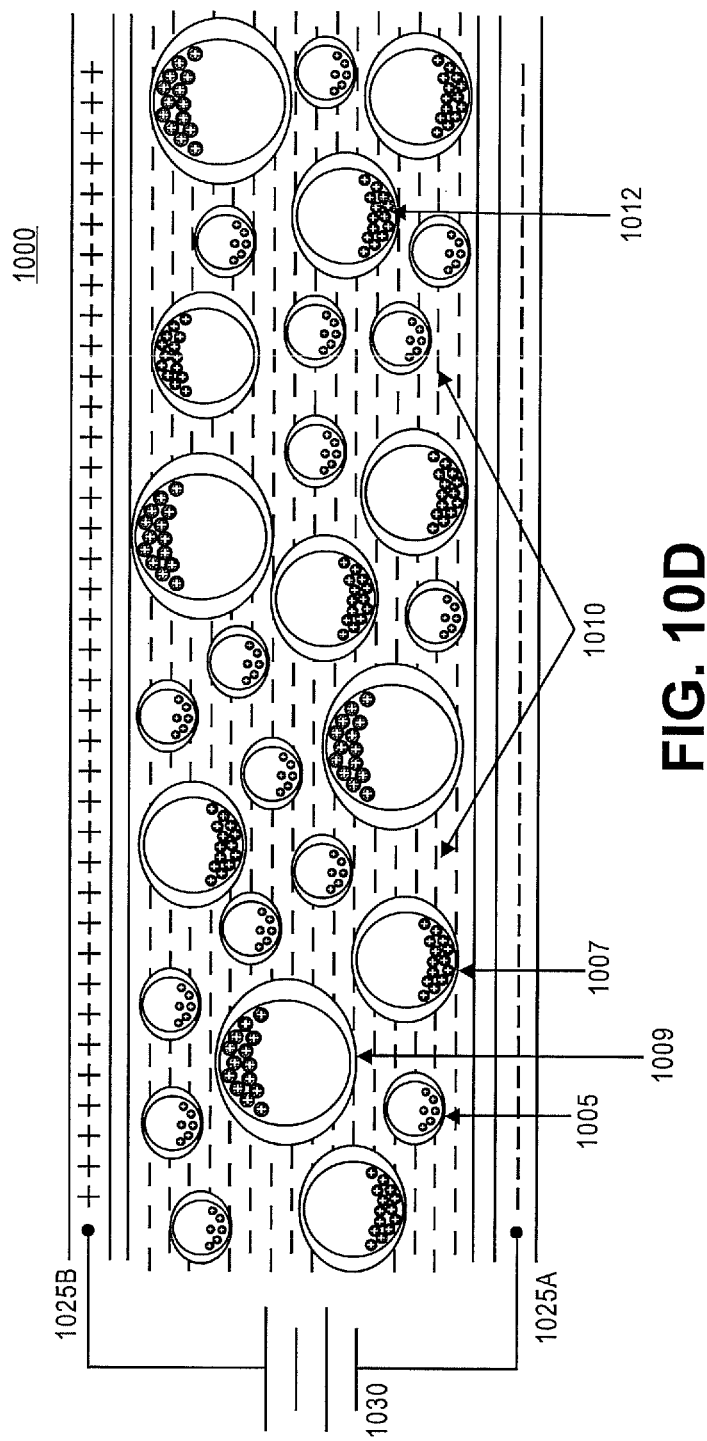
Figure 10E:
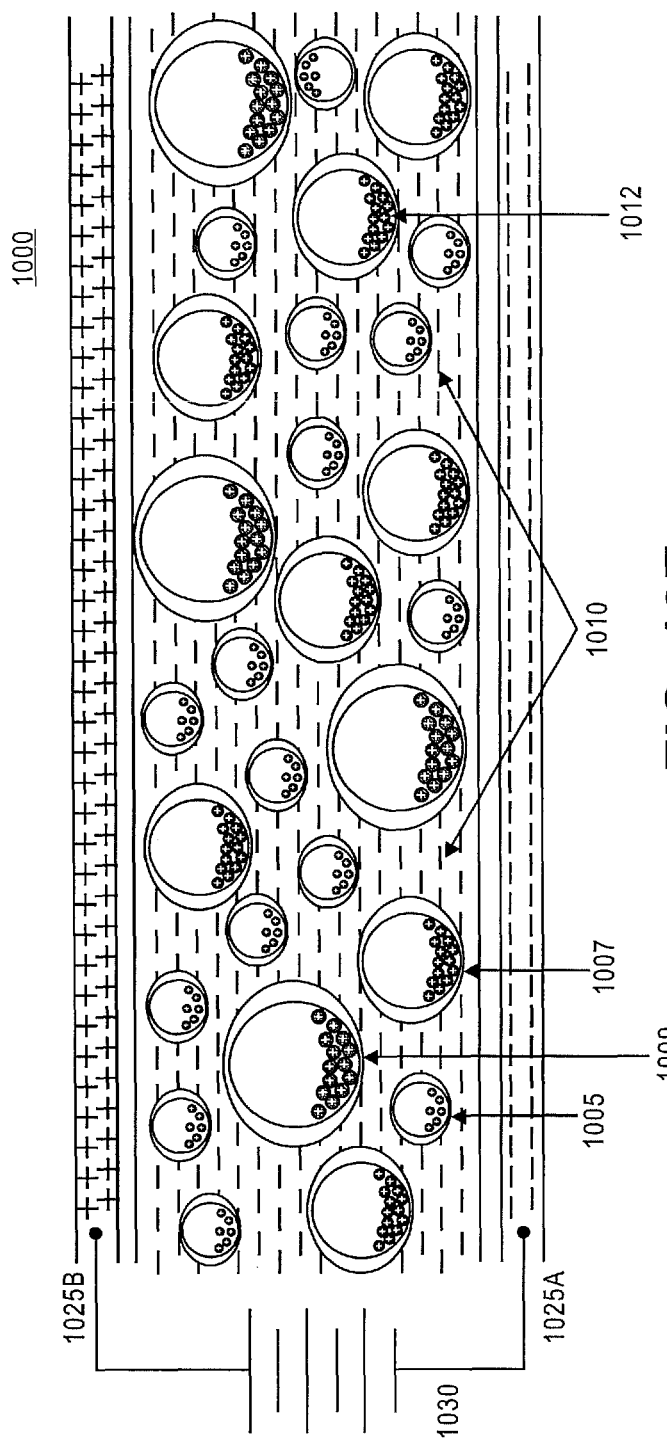

In FIG. 10D, a field above the threshold of the family of capsules having the smallest size 1005 and the family of capsules having the medium size 1007 but below the threshold of the family of capsules having the large size 1009 is applied. In this condition, ink 1012 in the family of capsules having the smallest size 1005 and the family of capsules having the medium size 1007 move, in this case toward the negative electrode 1025A. The ink 1012 in the family of capsules having the large size 1009 stays put. Thus, a third level of gray for the display is achieved.

Finally, in FIG. 1E, a field above the threshold of all families of capsules 1005, 1007, and 1009 is applied. In this condition, ink 1012 in each of the capsules moves towards the negative electrode 1025B thereby generating a fourth gray level. Removing the field or applying a field below the threshold of the family of capsules having the smallest size 1005 leaves the display unchanged from the condition shown in FIG. 10E. Those having skill in the art would also understand that removing the electric field or supplying a field below the threshold of the family of capsules having the smallest size 1005 leaves the display unchanged from the respective conditions depicted in FIGS. 10C and 10D.

Figure 11:
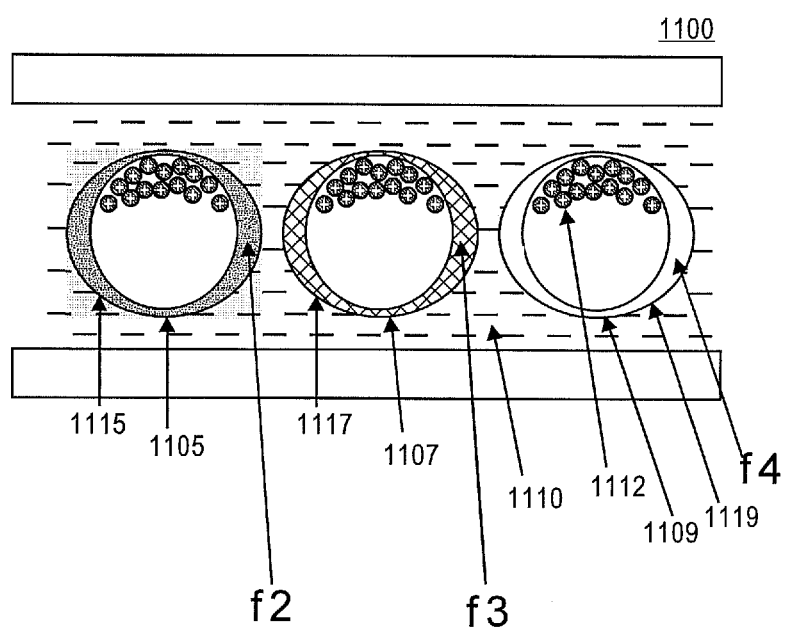
FIG. 11 illustrates another exemplary system in accordance with yet another embodiment.

FIG. 11 illustrates another exemplary system 1100 in accordance with yet another embodiment capable of achieving gray levels. For matters of simplicity, system 1100 shows three ink capsules, 1105, 1107, and 1109, each having a different threshold. It is well within the scope of the embodiments that the system 1100 can contain multiple families of ink capsules, where each family comprises multiple capsules and where each family of ink capsules has a different threshold, with the threshold of each capsule within a family being the same or similar. In system 1100, the different thresholds can be obtained using capsules having housings 1115, 1117, and 1119, having different electric permittivities, or where the capsules 1105, 1107, 1109 are coated with different materials having different electric permittivity. For example, capsule 1105 can have a housing or a coating providing a permittivity of $\in_1$, capsule 1107 can have a housing or a coating providing a permittivity of $\in_2$, and capsule 1109 can have a housing or a coating providing a permittivity of $\in_3$. According to various embodiments, $\in_1 \neq \in_2 \neq \in_3$. In some embodiments the capsules 1105, 1107, and 1109 can have similar sizes, while in other embodiments, the capsules can have different sizes.

In FIG. 11, there are three capsules 1105, 1107, and 1109, with permittivity dependent thresholds embedded in a charged electret substrate 1110 in a similar arrangement as described above. For illustrative purposes, the capsule 1105 with permittivity $\in_1$ may have the lowest threshold, the capsule 1109 with permittivity $\in_3$ may have the highest threshold, and the capsule 1107 with permittivity $\in_2$ may have a threshold between that of capsule 1105 and capsule 1109.

As discussed above, FIG. 11 depicts three ink capsules for ease of illustration. One of ordinary skill in the art will understand that more than three ink capsules are envisioned. For example, in another exemplary embodiment gray levels can be achieved by a plurality of capsules having a range of thresholds. The exemplary embodiment can include an electret substrate and a plurality of capsules embedded in the electret substrate. Each capsule of the plurality of capsules can include a housing and a plurality of charged pigment particles suspended within a fluid. Moreover, each capsule of the plurality of capsules can have a different threshold such that the thresholds form a range of thresholds. The range of thresholds can be achieved by, for example, changing the geometry of the housing or by changing the permittivity of the capsules.

While the invention has been described with reference to the exemplary embodiments thereof, those skilled in the art will be able to make various modifications to the described embodiments without departing from the scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible.

What is claimed is:

1. A system for electronic paper comprising:
an electret substrate;
a first plurality of capsules embedded in the electret substrate,
wherein the first plurality of capsules comprise a first housing having a first housing wall geometry; and
a second plurality of capsules embedded in the electret substrate, wherein the second plurality of capsules comprise a second housing having a second housing wall geometry different than the first housing wall geometry,
wherein each of the first plurality of capsules and the second plurality of capsules further comprise a first plurality of charged pigment particles suspended within a fluid.

2. The system for electronic paper of claim 1, wherein the fluid is opaque.

3. The system for electronic paper of claim 1,
wherein each of the first plurality of capsules and the second plurality of capsules further comprises a second plurality of charged pigment particles suspended within the fluid, and
wherein a charge of the second plurality of charged pigment particles is opposite a charge of the first plurality of charged pigment particles.

4. The system for electronic paper of claim 3, wherein the fluid is clear.

5. The system for electronic paper of claim 1, wherein the first housing wall geometry and the second housing wall geometry differ in one of size, shape and wall thickness.

6. The system for electronic paper of claim 3, further comprising:
a first electrode interfacing with one side of the electret substrate; and
a second electrode interfacing with a second side of the electret substrate,
wherein the first plurality of charged pigment particles move in the direction of one of the first and second electrodes having a polarity that is opposite to that of the first plurality of the charged pigment particles in response to a voltage applied between the first and second electrodes that is greater than a first threshold, and
wherein the second plurality of charged pigment particles move in the direction of one of the first and second electrodes having a polarity that is opposite to that of the second plurality of the charged pigment particles in response to a voltage applied between the first and second electrodes that is greater than a second threshold, the second threshold differing from the first threshold.

7. The system for electronic paper of claim 1, wherein the first housing comprises a first coating and the second housing comprises a second coating, and wherein a first threshold is determined based on the electric permittivity of the first coating and a second threshold is determined based on the electric permittivity of the second coating.

8. The system for electronic paper of claim 6, wherein each of the first and second electrodes comprises a multiplexing ITO array.

9. The system for electronic paper of claim 6, wherein the electret substrate comprises electrically charged polytetrafluoroethylene.

10. A system for electronic paper comprising:
an electret substrate; and
a plurality of capsules embedded in the electret substrate,
wherein each capsule of the plurality of capsules comprises a housing and a plurality of charged pigment particles suspended within a fluid, and
wherein each capsule of the plurality of capsules has a threshold such that the thresholds form a range of thresholds to provide grey level capability.

11. The system for electronic paper of claim 10, wherein the geometry of the housing of each of the plurality of capsules is varied to achieve the range of thresholds.

12. The system for electronic paper of claim 10, wherein the permittivity of each of the plurality of capsules is varied to achieve the range of thresholds.

* * * * *